July 19, 1955 A. H. LAMB ET AL 2,713,265
THERMOMETER
Filed May 11, 1951
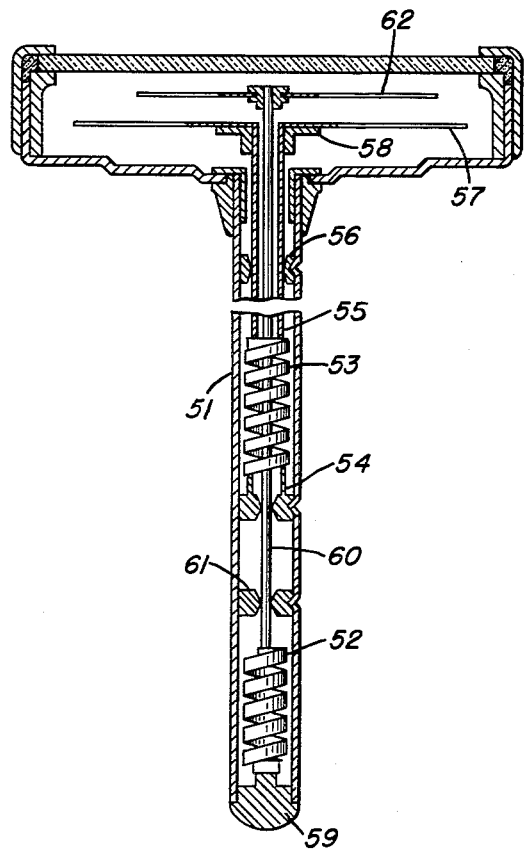
ANTHONY H. LAMB
AND EARL R. KEBBON
INVENTORS
BY
Gaylor, Cifelli & Quick
ATTORNEYS

United States Patent Office 2,713,265
Patented July 19, 1955

2,713,265
THERMOMETER

Anthony H. Lamb, Hillside, and Earl R. Kebbon, Chatham, N. J., assignors to Weston Electrical Instrument Corporation, Newark, N. J., a corporation of New Jersey Application May 11, 1951, Serial No. 225,792

1 Claim. (Cl. 73—340)

This invention relates to bimetallic thermometers and more particularly to a novel thermometer comprising two temperature-actuated elements having indicators cooperating with a single scale of temperature values.

This invention contemplates the provision of a bimetallic thermometer consisting of two, separate bimetal thermal elements, each element actuating individual indicators relative to a common scale calibrated in temperature values. Such arrangement makes it possible to read the difference, or depression, of temperature by noting the scale span between the two indicators, as well as the individual high and low temperature values. A dual element device, of this type, has many uses. Meteorologists are interested in the difference in temperature between sunny and shady free air, the air and the ground, etc. Agriculturists are interested in the temperature difference between the surrounding air and the inside of fruit, piles of grain, the inside and outside temperatures of rooms, vaults, trucks, warehouses, etc. Technicians are interested in air to ground temperature differentials with respect to radio wave phenomena. Weather experts, industrialists and householders are interested in such factors as dew point, relative humidity, etc. All of these uses fall within the scope of application of a dual element thermometer as described hereinbelow.

An object of this invention is the provision of a dual element thermometer having two temperature-sensitive elements actuating individual indicating members which cooperate with a single scale of temperature values.

An object of this invention is the provision of a dual element thermometer comprising a casing, a shell extending from said casing, a first bimetallic coil disposed within said shell, a staff secured to one end of the first bimetallic coil, a pointer secured to said staff said pointer disposed within the casing, a second bimetallic coil disposed within said shell, a tube secured to one end of the second bimetallic coil and a scale plate disposed within the casing and secured to one end of said tube.

These and other objects and advantages will become apparent from the following description when taken with the accompanying drawing.

The drawing illustrates a dual element thermometer of co-axial construction. A single tubular shell 51 extends from the instrument casing such shell housing the lower coil 52 and the upper coil 53. These coils are formed of a bimetallic ribbon wound into a helix. The upper coil has one end secured to a bushing 54 and the other end secured to the hollow shaft 55 that is rotatable within the bearing member 56. The bushing 54 is secured in fixed position within the shell as by staking. A scale plate 57, carrying appropriate temperature graduations, is secured to the hollow shaft 55 as by cement applied to the bushing 58. The lower coil 52 has one end secured to the fixed plug 59 and the other end to the staff 60, said staff passing through the bearing 61, through the bushing 54, and through the hollow shaft 55. A pointer 62 is secured to the staff 60. Whether the temperature-sensitive coils 52 and 53 rotate in the same or reverse directions in response to a temperature change, is a matter of design choice to meet the requirements of a particular application. Also, the scale plate 57 can be replaced by a pointer and a fixed scale plate can be secured within the instrument casing. When the scale 57 and the pointer 62 are arranged to move in the same direction upon a given change in temperature, the device is useful to indicate the temperature difference between two regions. For example, if only the lower portion of the shell be inserted into a medium, such as the ground or an orange, the temperature difference between the medium and the surrounding atmosphere (effective upon the upper coil 53) can be read from the displacement of the pointer 62 from its original position relative to the scale 57. So too, such arrangement is adapted for the provision of a relative humidity indicator, it being merely required to place a moist wick over that portion of the shell occupied by the lower coil 52 to obtain a depression reading.

When the scale and pointer are arranged to rotate in opposite directions the device serves as a relatively low range thermometer having a large relative pointer displacement per unit change in temperature. Thus, if each temperature-sensitive coil has a sensitivity corresponding to one (1) angular degree of rotation per change of one (1) degree in temperature the relative displacement between the pointer 62 and scale 57 will be two (2) angular degrees per degree change in temperature effective along the entire shell 51. The speed of response and the angular deflection of a bimetallic coil varies with the thickness and length of the bimetal and the helical coils are necessarily long and delicate in a thermometer of high sensitivity and low time lag. Further, the combined weight of the staff and the associated pointer is supported by the helical coil which places design limits upon the maximum cross-section and maximum length of the bimetallic ribbon employed to form the coil. These factors constitute limitations in conventional single coil thermometers which limitations, however, are overcome by our construction.

Having now described our invention in detail in accordance with the patent statutes what we desire to secure by Letters Patent is set forth in the following claim.

We claim:

A dual element thermometer of the bimetallic type comprising a cup-like casing; a transparent cover closing the casing; a tubular shell extending centrally from the rear of the casing, said shell having a plug closing one end and the other end communicating with the interior of the casing; a bushing fixed within the shell intermediate the ends thereof, said bushing including an axial hole; a first helical coil of bimetallic material in said shell on one side of said bushing, said coil having one end secured to the said bushing; a hollow shaft rotatably mounted in said shell, said shaft having one end secured to the other end of the first said coil and having its other end extending into the casing; a scale plate carrying a scale of temperature values disposed within said casing and secured to the said other end of the said hollow shaft, said scale plate including a central opening; a second helical coil of bimetallic material in said shell on the other side of said bushing; said second helical coil having one end secured to the plug; a staff secured to the other end of the said second coil and extending rotatably through the hollow bushing and through the opening in the scale plate; and a pointer secured to the other end of the staff and cooperating with the scale of temperature values on the scale plate.

References Cited in the file of this patent

UNITED STATES PATENTS

| 845,995 | Benecke | Mar. 5, 1907 |
|---|---|---|
| 1,162,446 | Bristol | Nov. 30, 1915 |
| 1,628,137 | Giesler | May 10, 1927 |
| 2,007,324 | Budgett | July 9, 1935 |
| 2,075,487 | Van Zandt | Mar. 30, 1937 |
| 2,184,472 | Sand | Dec. 26, 1939 |
| 2,365,487 | Murray | Dec. 19, 1944 |

FOREIGN PATENTS

| 179,901 | Switzerland | Sept. 30, 1935 |